United States Patent
Zhang et al.

(10) Patent No.: US 10,994,386 B2
(45) Date of Patent: May 4, 2021

(54) ULTRASONIC PEENING-TYPE INTEGRATED MACHINING METHOD OF CUTTING AND EXTRUSION

(71) Applicant: Beihang University, Beijing (CN)

(72) Inventors: Deyuan Zhang, Beijing (CN); Zhenghui Lu, Beijing (CN); Xun Li, Beijing (CN); Xinggang Jiang, Beijing (CN); Shenliang Yang, Beijing (CN); Xiangyu Zhang, Beijing (CN); Daxi Geng, Beijing (CN)

(73) Assignee: Beihang University, Beijing (CN)

( * ) Notice: Subject to any disclaimer, the term of this patent is extended or adjusted under 35 U.S.C. 154(b) by 112 days.

(21) Appl. No.: 16/544,467

(22) Filed: Aug. 19, 2019

(65) Prior Publication Data
US 2020/0346313 A1 Nov. 5, 2020

(30) Foreign Application Priority Data
Apr. 30, 2019 (CN) .......................... 201910360339.5

(51) Int. Cl.
B24B 35/00 (2006.01)
B24B 1/04 (2006.01)
(Continued)

(52) U.S. Cl.
CPC ............... B24B 1/04 (2013.01); B24B 35/00 (2013.01); B24B 39/006 (2013.01); B24C 1/10 (2013.01); B28D 5/047 (2013.01); B24C 5/005 (2013.01)

(58) Field of Classification Search
CPC ........... B24B 1/04; B24B 35/00; B28D 5/047; B24C 1/10
(Continued)

(56) References Cited

U.S. PATENT DOCUMENTS 3,619,671 A * 11/1971 Shoh .......................... B06B 1/06
310/325
2005/0145306 A1 * 7/2005 Statnikov ............. B23K 20/106
148/508
(Continued)

OTHER PUBLICATIONS

Chinese Master Thesis Full Database entitled "Research on Characteristics of Finished Surface by Ultrasonic Elliptical Vibration Cutting" with English Abstract, Engineering Science and Technology, Aug. 16, 2015.
(Continued)

Primary Examiner — Eileen P Morgan
(74) Attorney, Agent, or Firm — Harness, Dickey & Pierce, P.L.C.

(57) ABSTRACT

An ultrasonic peening-type integrated machining method for cutting and extrusion includes: applying transverse ultrasonic vibration or a vibration component, which is vertical to a cutting speed direction to a cutting tool on a machine tool; setting a cutting parameter and an ultrasonic vibration parameter such that a dynamic negative clearance angle is generated in a cutting procedure and a flank face of the cutting tool conducts ultrasonic peening extrusion on the surface of the workpiece; setting an extrusion overlap ratio; setting a wear standard of flank faces extruded by the cutting tool; controlling a vibration cutting trajectory phase difference of the cutting tool during two adjacent rotations; and turning on the machine tool in order to ensure that cutting and surface extrusion strengthening of the workpiece are completed in one procedure without separate strengthening procedures. The method conducts extrusion strengthening on the surface of the workpiece while cutting the workpiece.

6 Claims, 17 Drawing Sheets

(51) Int. Cl.
*B24B 39/00* (2006.01)
*B24C 1/10* (2006.01)
*B28D 5/04* (2006.01)
*B24C 5/00* (2006.01)

(58) Field of Classification Search
USPC ............... 451/54, 55, 69, 165, 910; 148/558
See application file for complete search history.

(56) References Cited

U.S. PATENT DOCUMENTS

| | | | |
|---|---|---|---|
| 2017/0100781 A1* | 4/2017 | Zhang | ................... B23D 75/00 |
| 2018/0010253 A1* | 1/2018 | Guo | ........................ B44B 3/009 |
| 2018/0354096 A1* | 12/2018 | Li | ........................... B24B 55/02 |
| 2020/0023485 A1* | 1/2020 | Li | ............................ B24B 1/04 |
| 2020/0048725 A1* | 2/2020 | Gao | ..................... B24B 39/026 |

OTHER PUBLICATIONS

Xinggang Jiang et al., "Study of Phase Shift Control in High-Speed Ultrasonic Vibration Cutting", IEEE Transactions on Industrial Electronics, vol. 65, No. 3, Mar. 2018, pp. 2467-2474.

* cited by examiner

ULTRASONIC PEENING-TYPE INTEGRATED MACHINING METHOD OF CUTTING AND EXTRUSION

CROSS-REFERENCE TO RELATED APPLICATIONS

This application claims priority to Chinese application number 201910360339.5, filed Apr. 30, 2019, with a title of ULTRASONIC PEENING-TYPE INTEGRATED MACHINING METHOD OF CUTTING AND EXTRUSION. The above-mentioned patent application is incorporated herein by reference in its entirety.

FIELD

The present invention relates to the field of machining and workpiece surface strengthening, and in particular, to an ultrasonic peening-type integrated machining method of cutting and extrusion.

BACKGROUND

With the development of high-tech equipment in the fields of aerospace, weapon, nuclear power, transportation and the like, requirements on properties of a surface of a part are higher and higher. Main failure modes of the material are wear, corrosion, fatigue and the like. Fatigue cracks will generate on a surface of the material under load, and if they further develop, fatigue fracture of the material will occur to cause overall failure of a component, so surface anti-fatigue manufacturing plays an important role in the part producing and manufacturing procedures. In order to improve reliability of the part and prolong its service life, surface strengthening technologies are generally used to process a surface structure of the part without changing properties of the matrix material. Common surface strengthening technologies include shot peening, surface rolling, laser peening and the like. The shot peening is to use high-speed shots to intensely peen a surface of the part or component so as to generate a strain hardening layer and induce residual compressive stress; the surface rolling/extrusion is to use a rolling/extrusion tool in a certain form to apply a pressure with a certain value to a surface of the material such that the surface generates a tiny local plastic deformation to achieve effects of improving the surface roughness and obtaining the residual compressive stress; and the laser peening is to use high-power-density stress waves generated by laser induction such that a metal surface generates plastic deformation to cause dislocation density increasing and generate the residual compressive stress so as to improve properties including hardness, fatigue life and the like.

However, all the above common surface strengthening technologies have deficiencies or development limitations. The shot peening is hard to accurately control a strengthening area and causes roughness increasing of a workpiece surface to be processed due to plastic indentations formed by shot peening; the surface rolling/extrusion is easy to influence processing accuracy of weak-rigidity parts due to a relatively large action force, is easy to cause workpiece surface scratching or generate adverse residual stress at a relatively large processing speed, and is hard to be achieved by utilizing the traditional machining equipment in the existing production line; and although the laser peening can achieve relatively great effects, it has generally relatively low peening efficiency and relatively long processing procedure, and the laser peening equipment is very expensive, all of which limit large-scale application of the laser peening. Additionally, a common problem of these surface strengthening technologies is to essentially add a strengthening procedure, but to a narrow structure, the strengthening reachability is poor.

The common cutting can achieve a certain effect of ironing the workpiece surface generally by utilizing methods of adjusting parameters including arc radius of a cutting edge of a cutting tool, cutting depth and the like or arranging a negative chamfer at the cutting edge of the cutting tool; however, such methods bring a great radical thrust force and also influence the processing accuracy of the weak-rigidity parts like the surface rolling/extrusion technology.

SUMMARY

An objective of the present invention is to provide an ultrasonic peening-type integrated machining method of cutting and extrusion, which does not need to add a strengthening procedure and can conduct extrusion strengthening on a surface of a workpiece while cutting the workpiece.

To achieve the above purpose, the present invention provides the following technical solution.

An ultrasonic peening-type integrated machining method of cutting and extrusion includes:

applying transverse ultrasonic vibration, which is vertical to a cutting speed direction or includes a vibration component vertical to the cutting speed direction, to a cutting tool on a machine tool;

setting a cutting parameter and an ultrasonic vibration parameter such that a dynamic negative clearance angle is generated in a cutting procedure and a flank face of the cutting tool conducts ultrasonic peening extrusion on a surface of a workpiece;

setting an extrusion overlap ratio;

setting a wear standard of flank faces extruded by the cutting tool;

controlling a vibration cutting trajectory phase difference of the cutting tool during two adjacent rotations; and turning on the machine tool to ensure that cutting and surface extrusion strengthening of the workpiece are completed in one procedure.

Optionally, the applying transverse ultrasonic vibration, which is vertical to a cutting speed direction or includes a vibration component vertical to the cutting speed direction, to a cutting tool on a machine tool specifically includes:

applying radial or axial ultrasonic vibration vertical to the cutting speed direction to the cutting tool on the machine tool; or applying elliptical ultrasonic vibration including the vibration component vertical to the cutting speed direction to the cutting tool on the machine tool.

Optionally, the setting a cutting parameter and an ultrasonic vibration parameter such that a dynamic negative clearance angle is generated in a cutting procedure and a flank face of the cutting tool conducts ultrasonic peening extrusion on a surface of a workpiece specifically includes:

setting the cutting parameter and the ultrasonic vibration parameter to meet formula (1) such that the dynamic negative clearance angle is generated in the cutting procedure and the flank face of the cutting tool conducts the ultrasonic peening extrusion on the surface of the workpiece;

$$\alpha_t = \alpha - \arctan\frac{2\pi A F_z}{v_c} < 0 \qquad (1)$$

in the formula, $\alpha_t$ is a dynamic clearance angle, $\alpha$ is a nominal clearance angle of the cutting tool, $v_c$ is a cutting speed, A is an ultrasonic amplitude, and $F_z$ is an ultrasonic vibration frequency; a smaller dynamic clearance angle $\alpha_t$ indicates a larger amount of extrusion applied to the workpiece and a stronger extrusion effect;

the cutting parameter includes the cutting speed $v_c$ of the cutting tool, a feed rate $v_f$ and a cutting depth of the cutting tool; and the ultrasonic vibration parameter includes the ultrasonic vibration frequency $F_z$ and the ultrasonic amplitude A.

Optionally, the setting an extrusion overlap ratio specifically includes:

calculating an extrusion overlap ratio K by formula (2):

$$K = K_c \cdot K_f = \frac{l_e}{\lambda} \cdot \frac{w}{f_w} \qquad (2)$$

in the formula, the extrusion overlap ratio K is a ratio of the sum of multiple extrusion areas of the cutting tool to an area of a processed surface of the workpiece; $K_c$ is an overlap ratio in the cutting speed direction, $l_e$ is a length of a single extrusion in the cutting speed direction in a vibration cutting period, $\lambda$ is a vibration cutting wavelength, $K_f$ is an overlap ratio in a blade width direction of the cutting tool, w is a blade width of the cutting tool, and $f_w$ is a feeding amount in the blade width direction; and a larger extrusion overlap ratio K indicates a more outstanding extrusion effect.

Optionally, the setting a wear standard of flank faces extruded by the cutting tool specifically includes:

setting a corresponding wear standard of the flank face of the cutting tool according to a desired extrusion effect and a processing accuracy; wherein the desired extrusion effect considers: a nominal clearance angle of a flank face wear band is zero, so, when the flank face wear band replaces the flank face to extrude the workpiece, the dynamic clearance angle is further reduced, the length $l_e$ of a single extrusion in the vibration cutting period is increased, and the extrusion overlap ratio is increased;

the processing accuracy considers: the flank face wear band may increase the roughness of the processed surface of the workpiece and reduce the processing accuracy.

Optionally, the controlling a vibration cutting trajectory phase difference of the cutting tool during two adjacent rotations specifically includes:

acquiring a rotational frequency change amount $\Delta F_n$ of a machine tool spindle in real time, and compensating the ultrasonic vibration frequency by closed-loop control, wherein the compensation of the ultrasonic vibration frequency meets formula (3), the ultrasonic vibration frequency and the rotational frequency $F_n$ of the machine tool spindle are strictly synchronized, and the roughness of a machined surface of the workpiece is minimum;

$$\Delta F_z = M \cdot \Delta F_n \qquad (3)$$

in formula, $\Delta F_z$ is a compensation value of the ultrasonic vibration frequency, $\Delta F_n$ is the rotational frequency change amount of the machine tool spindle, M is a theoretical ratio of an ultrasonic vibration frequency required by controlling a specific phase difference to the rotational frequency $F_n$ of the machine tool spindle.

Optionally, the machine tool is a lathe, a milling machine, a drilling machine, a grinding machine or a machining center capable of conducting various cutting processing technologies.

Optionally, the cutting tool is a turning tool, a milling cutter, a grinding head, a drill bit, a reamer or a countersink bit capable of conducting various cutting processing technologies.

According to specific embodiments provided in the present invention, the present invention discloses the following technical effects: the ultrasonic peening-type integrated machining method of cutting and extrusion includes: applying transverse ultrasonic vibration, which is vertical to a cutting speed direction or includes a vibration component vertical to the cutting speed direction, to a cutting tool on a machine tool; setting a cutting parameter and an ultrasonic vibration parameter such that a dynamic negative clearance angle is generated in a cutting procedure and a flank face of the cutting tool conducts the ultrasonic peening extrusion on the surface of the workpiece; setting an extrusion overlap ratio; setting a wear standard of flank faces extruded by the cutting tool; controlling a vibration cutting trajectory phase difference of the cutting tool during two adjacent rotations; and turning on the machine tool in order to ensure that cutting and surface extrusion strengthening of the workpiece are completed in one procedure. According to the method, by controlling and utilizing characteristics of the dynamic negative clearance angle of vibration cutting, the flank face of the cutting tool conducts peening extrusion on the surface of the workpiece when the workpiece is cut, such that workpiece cutting and surface strengthening are conducted simultaneously and no additional surface strengthening procedure is required. Therefore, the method can further achieve effects of helping the processed surface of the workpiece to generate the residual compressive stress, improving microhardness of the surface, refining a surface structure of the workpiece, remarkably prolonging the fatigue life of the workpiece and the like by utilizing the peening extrusion of the flank face of the cutting tool to the surface of the workpiece when reducing a cutting force and cutting heat.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide an ultrasonic peening-type integrated machining method of cutting and extrusion, which does not need to add a strengthening procedure and can conduct extrusion strengthening on a surface of a workpiece while cutting the workpiece.

To make the foregoing objective, features, and advantages of the present invention clearer and more comprehensible, the present invention is further described in detail below with reference to the accompanying drawings and specific embodiments.

Figure 1:
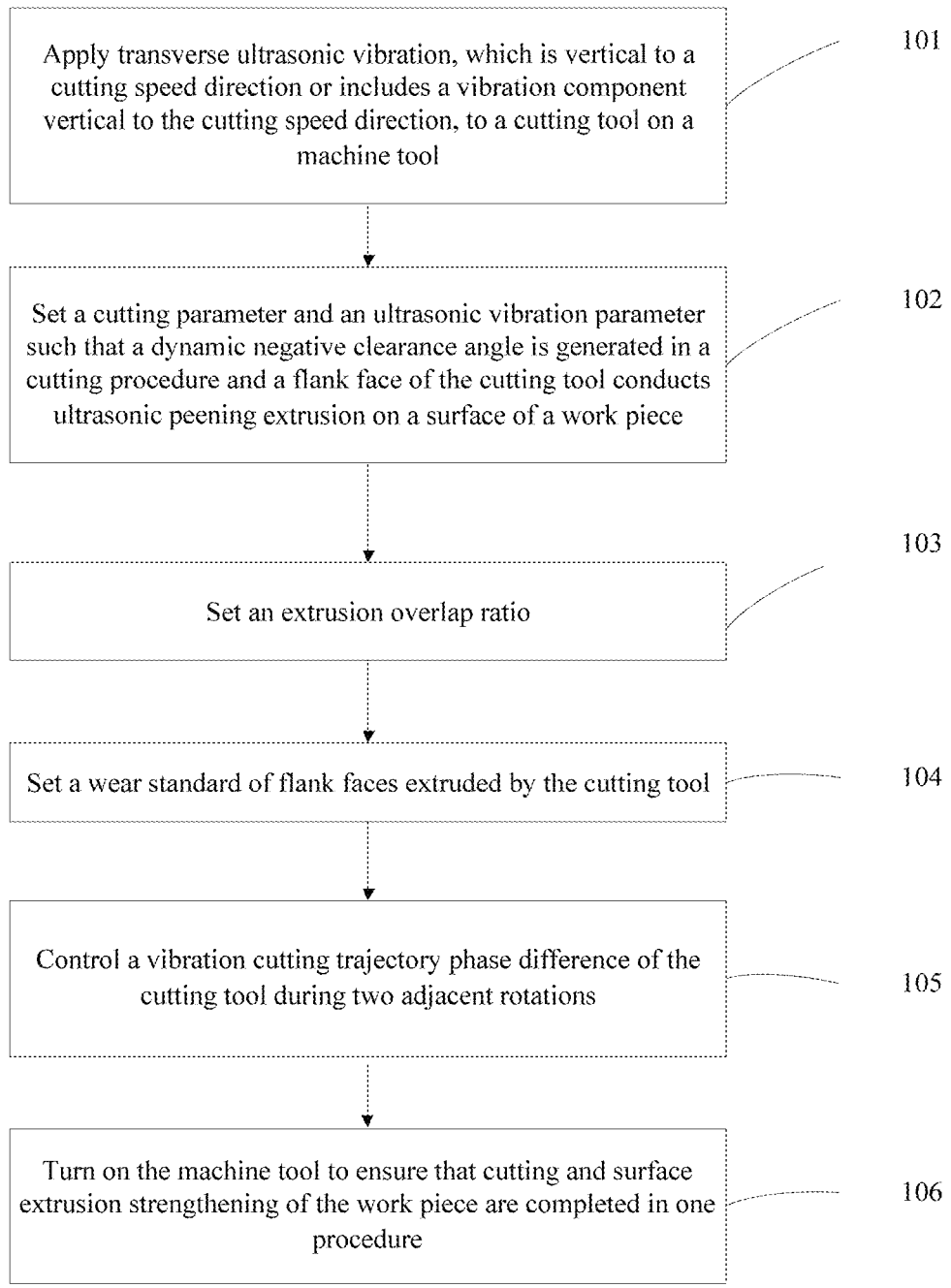
FIG. 1 is a flow chart of an embodiment of an ultrasonic peening-type integrated machining method of cutting and extrusion of the present invention.

FIG. 1 is a flow chart of an embodiment of an ultrasonic peening-type integrated machining method of cutting and extrusion of the present invention. Referring to FIG. 1, the ultrasonic peening-type integrated machining method of cutting and extrusion includes:

Step 101: apply transverse ultrasonic vibration, which is vertical to a cutting speed direction or includes a vibration component vertical to the cutting speed direction, to a cutting tool on a machine tool;

the step 101 specifically includes:

apply radial or axial ultrasonic vibration vertical to the cutting speed direction to the cutting tool on the machine tool, or apply elliptical ultrasonic vibration including the vibration component vertical to the cutting speed direction to the cutting tool on the machine tool.

The machine tool is a lathe, a milling machine, a drilling machine, a grinding machine or a machining center capable of conducting various cutting processing technologies.

The cutting tool is a turning tool, a milling cutter, a grinding head, a drill bit, a reamer or a countersink bit capable of conducting various cutting processing technologies.

Step 102: set a cutting parameter and an ultrasonic vibration parameter such that a dynamic negative clearance angle is generated in a cutting procedure and a flank face of the cutting tool conducts ultrasonic peening extrusion on a surface of a workpiece;

the step 102 specifically includes:

set the cutting parameter and the ultrasonic vibration parameter to meet formula (1) such that the dynamic negative clearance angle is generated in the cutting procedure and the flank face of the cutting tool conducts the ultrasonic peening extrusion on the surface of the workpiece;

$$\alpha_t = \alpha - \arctan\frac{2\pi AF_z}{v_c} < 0 \qquad (1)$$

in the formula, $\alpha_t$ is a dynamic clearance angle, $\alpha$ is a nominal clearance angle of the cutting tool, $v_c$ is a cutting speed, A is an ultrasonic amplitude, and $F_z$ is an ultrasonic vibration frequency; a smaller dynamic clearance angle $\alpha_t$ indicates a larger amount of extrusion applied to the workpiece material and a stronger strengthening effect;

the cutting parameter includes the cutting speed $v_c$ of the cutting tool, a feed rate $v_f$ and a cutting depth of the cutting tool; and the ultrasonic vibration parameter includes the ultrasonic vibration frequency $F_z$ and the ultrasonic amplitude A.

Step 103: set an extrusion overlap ratio;

the step 103 specifically includes:

calculate an extrusion coverage K by formula (2):

$$K = K_c \cdot K_f = \frac{l_e}{\lambda} \cdot \frac{w}{f_w} \qquad (2)$$

in the formula, the extrusion coverage K is a ratio of the sum of multiple extrusion areas of the cutting tool to an area of a processed surface of the workpiece; $K_c$ is an overlap ratio in the cutting speed direction, $l_e$ is a length of a single extrusion in the cutting speed direction in a vibration cutting period, λ is a vibration cutting wavelength, $K_f$ is an overlap ratio in a blade width direction of the cutting tool, w is a blade width of the cutting tool, and $f_w$ is a feeding amount in the blade width direction;

and a larger extrusion overlap ratio K indicates a more outstanding extrusion effect.

Step 104: set a wear standard of flank faces extruded by the cutting tool;

the step 104 specifically includes:

set a corresponding wear standard of the flank face of the cutting tool according to a desired extrusion effect and a processing accuracy;

the desired extrusion effect considers: a nominal clearance angle of a flank face wear band is zero, so, when the flank face wear band replaces the flank face to extrude the workpiece, the dynamic clearance angle is further reduced, the length $l_e$ of a single extrusion in the vibration cutting period is increased, and the extrusion overlap ratio is increased; and the processing accuracy considers: the flank face wear band may increase the roughness of the processed surface of the workpiece and reduce the processing accuracy.

Step 105: control a vibration cutting trajectory phase difference of the cutting tool during two adjacent rotations;

the step 105 specifically includes:

acquire a rotational frequency change amount $\Delta F_n$ of a machine tool spindle in real time, and compensate the ultrasonic vibration frequency by closed-loop control, where the compensation of the ultrasonic vibration frequency meets formula (3), the ultrasonic vibration frequency and the rotational frequency $F_n$ of the machine tool spindle are strictly synchronized, and the roughness of a machined surface of the workpiece is minimum;

$$\Delta F_z = M \cdot \Delta F_n \quad (3)$$

in formula, $\Delta F_z$ is a compensation value of the ultrasonic vibration frequency, $\Delta F_n$ is the rotational frequency change amount of the machine tool spindle, and M is a theoretical ratio of an ultrasonic vibration frequency required by controlling a specific phase difference to the rotational frequency $F_n$ of the machine tool spindle.

Step 106: turn on the machine tool to ensure that cutting and surface extrusion strengthening of the workpiece are completed in one procedure.

The ultrasonic peening-type integrated machining method of cutting and extrusion utilizes peening extrusion of the flank face of the cutting tool conducts to the surface of the workpiece to achieve that workpiece cutting and surface extrusion strengthening are conducted simultaneously when the workpiece is cut, so additional surface strengthening procedures are not needed. The method can further achieve the following effects of helping the processed surface of the workpiece to generate the residual compressive stress, improving microhardness of the surface, refining a surface structure of the workpiece to further restrain generation and development of fatigue cracks, and remarkably prolonging the fatigue life of the workpiece by utilizing the extrusion of the flank face of the cutting tool to the surface of the workpiece on the premise of ensuring the roughness of the processed surface when a cutting force and cutting heat are reduced by ultrasonic vibration cutting. Compared with the prior art in which surface strengthening of a part needs two steps: firstly conduct cutting processing or additive manufacturing on a blank to obtain a part, and then conduct surface strengthening on the part, the present invention can achieve the surface strengthening in the cutting procedure; compared with the existing surface strengthening technologies in which a special strengthening device or apparatus must conduct the strengthening in a normal direction of the surface of the part surface, which is hard to be completed in a narrow structure, the present invention can achieve the surface strengthening only by using the cutting tool; and all parts obtained by the cutting processing can conduct surface strengthening by utilizing the method of the present invention.

Figure 2:
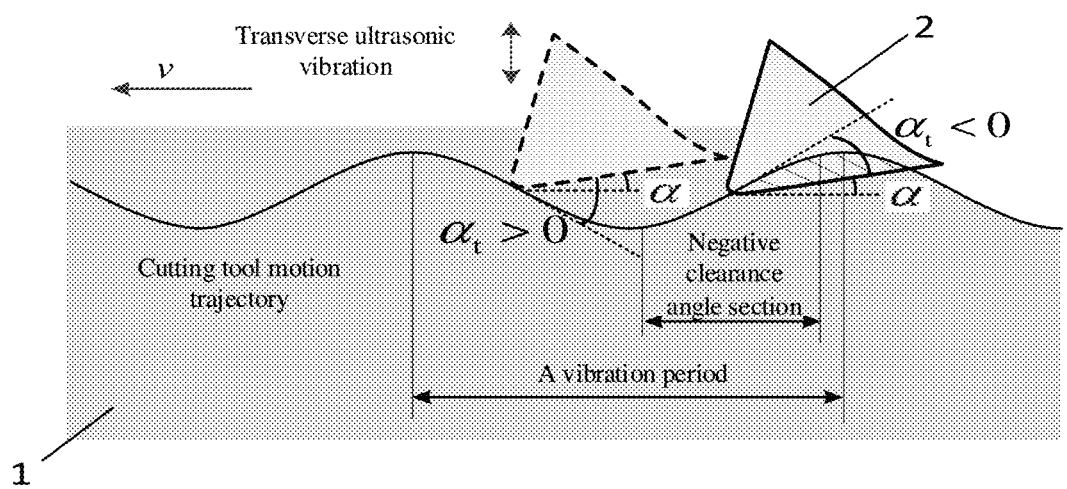
FIG. 2 is a schematic diagram showing the change of a dynamic clearance angle according to an embodiment of an ultrasonic peening-type integrated machining method of cutting and extrusion of the present invention.

FIG. 2 is a schematic diagram showing the change of a dynamic clearance angle of an embodiment of an ultrasonic peening-type integrated machining method of cutting and extrusion according to the present invention. Referring to FIG. 2, when a workpiece 1 conducts ultrasonic vibration cutting, and an instantaneous dynamic clearance angle $α_t$ is less than zero, a flank face of a cutting tool 2 generates extrusion to a surface of the workpiece 1. In FIG. 2, α is a nominal clearance angle, namely a cutting clearance angle of the cutting tool without conducting the ultrasonic vibration. In FIG. 2, 1 represents the workpiece, and 2 represents the cutting tool.

Figure 3:
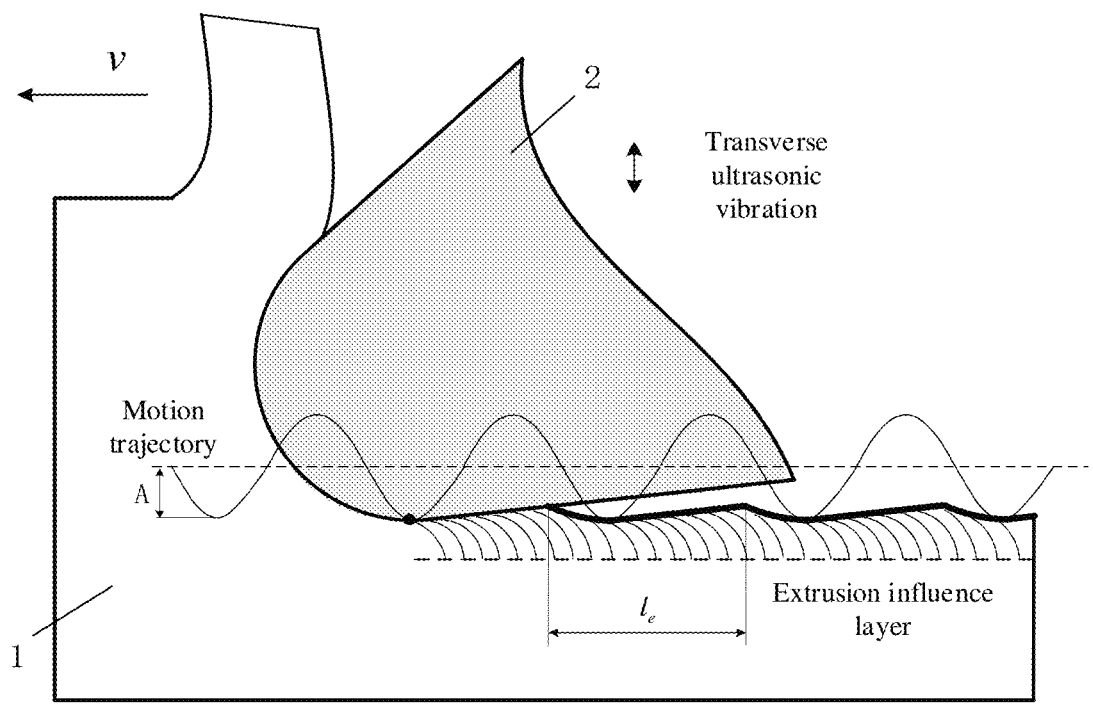
FIG. 3 is a schematic diagram of a cutting and extruding principle according to an embodiment of an ultrasonic peening-type integrated machining method of cutting and extrusion of the present invention.

FIG. 3 is a schematic diagram of a cutting and extruding principle according to an embodiment of an ultrasonic peening-type integrated machining method of cutting and extrusion of the present invention. Referring to FIG. 3, a flank face of a cutting tool conducts once extrusion on a surface of a workpiece in a negative clearance angle section of an ultrasonic vibration period; and the flank face conducts multiple ultrasonic extrusion on the surface of the workpiece along with a cutting procedure to finally form a plastic deformation layer on a processed surface. In FIG. 3, 1 represents the workpiece, 2 represents the cutting tool, and $l_e$ is a length of a single extrusion in one ultrasonic vibration period.

Figure 4:
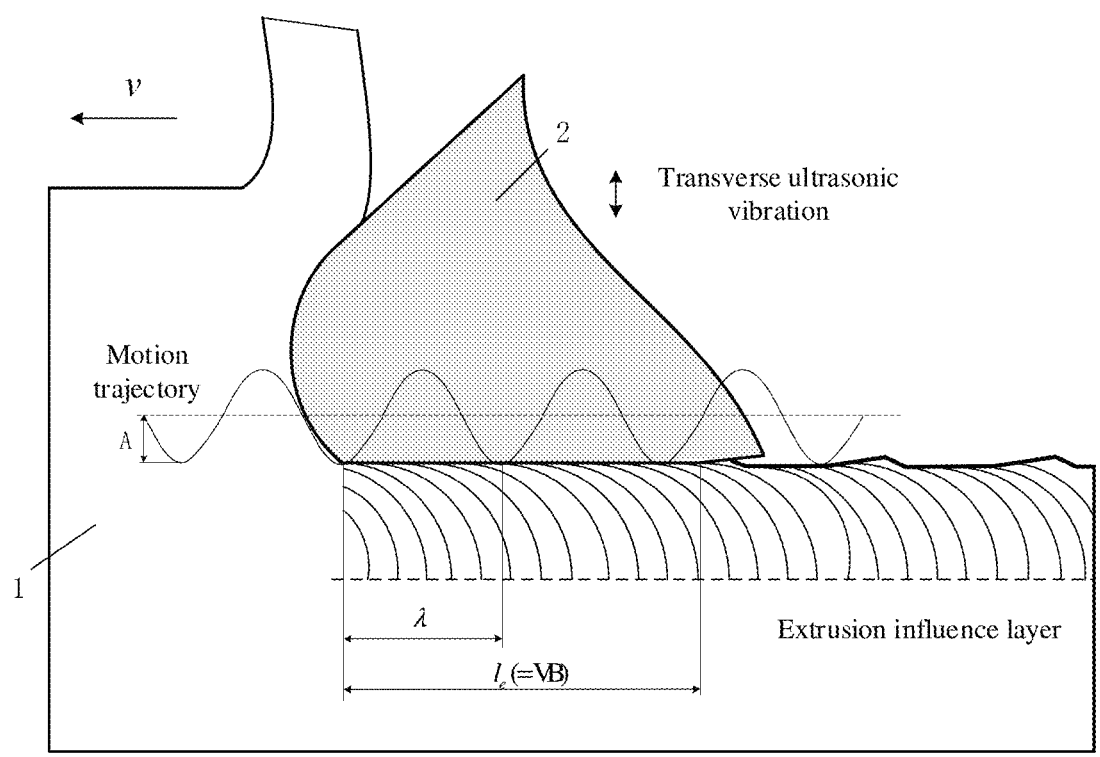
FIG. 4 is a schematic diagram of a cutting and extruding principle of a cutting tool having a flank face wear band according to an embodiment of an ultrasonic peening-type integrated machining method of cutting and extrusion of the present invention.

FIG. 4 is a schematic diagram of a cutting and extruding procedure of a cutting tool having a flank face wear band according to an embodiment of an ultrasonic peening-type integrated machining method of cutting and extrusion of the present invention. Referring to FIG. 4, when the flank face wear band VB of the cutting tool is greater than or equal to a vibration cutting wavelength λ, the wear band replaces the flank face to extrude a workpiece, and the greater the length $l_e$ of a single extrusion in the vibration cutting period is, the more outstanding the extrusion effect compared with a sharp cutting tool is. In FIG. 4, 1 represents the workpiece, and 2 represents the cutting tool.

Figure 5:
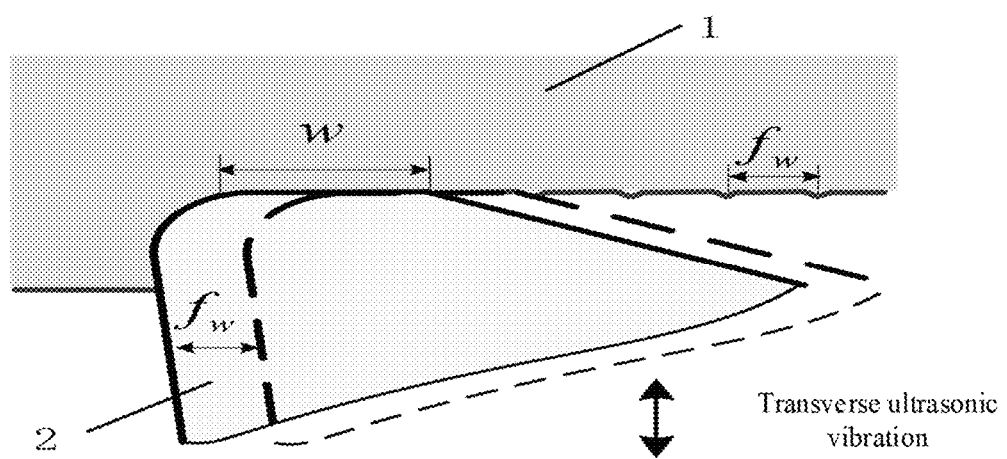
FIG. 5 is a schematic diagram when a cutting edge of a cutting tool repeatedly extrudes a surface of a workpiece during multi-rotation cutting according to an embodiment of an ultrasonic peening-type integrated machining method of cutting and extrusion of the present invention.

FIG. 5 is a schematic diagram when a cutting edge of a cutting tool repeatedly extrudes a surface of a workpiece during multi-rotation cutting according to an embodiment of an ultrasonic peening-type integrated machining method of cutting and extrusion of the present invention; referring to FIG. 5, a cutting speed direction is vertical to a principle plane, and the cutting edge of the cutting tool conducts repeated extrusion to the same position of the surface of the workpiece during multi-rotation cutting so as to reinforce an extrusion effect. w is a blade width of the cutting tool, and $f_w$ is a feeding amount in a blade width direction.

Figure 6:
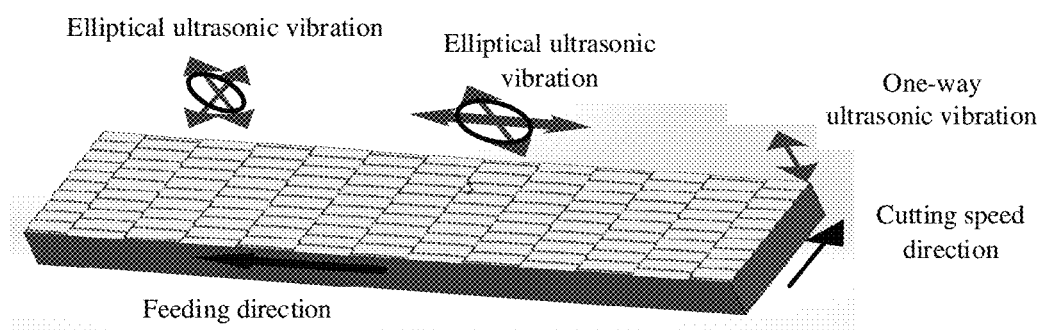
FIG. 6 is a schematic diagram of an extrusion morphology during processing by utilizing an ultrasonic peening-type integrated machining method of cutting and extrusion of the present invention.

FIG. 6 is a schematic diagram of an extrusion morphology during processing by utilizing an ultrasonic peening-type integrated machining method of cutting and extrusion of the present invention; referring to FIG. 6, a cutting speed direction is a speed direction of main motion of a cutting edge of a cutting tool corresponding to a workpiece, where the main motion direction is an instantaneous main motion direction of a selected point of the cutting edge corresponding to the workpiece. The cutting speed is an instantaneous speed of the main motion of the selected point of the cutting edge corresponding to the workpiece. During turning, the workpiece rotates, and the position of the cutting edge is fixed, so the cutting speed direction is constant, an ultrasonic vibration direction is vertical to a cutting depth direction (in a radial direction of the workpiece) or is vertical to the speed when a direction component exists. During milling, grinding and drilling, the cutting tool rotates, and the cutting edge does rotational motion at every moment, so its cutting speed direction is also continuously changed; an axial direction of the cutting tool is vertical to a cutting speed plane, so an axial ultrasonic vibration direction of the cutting tool is vertical to the speed direction; and an elliptical ultrasonic vibration direction is continuously changed on the cutting speed plane, but a vibration component vertical to the cutting speed direction always exists.

Figure 7:
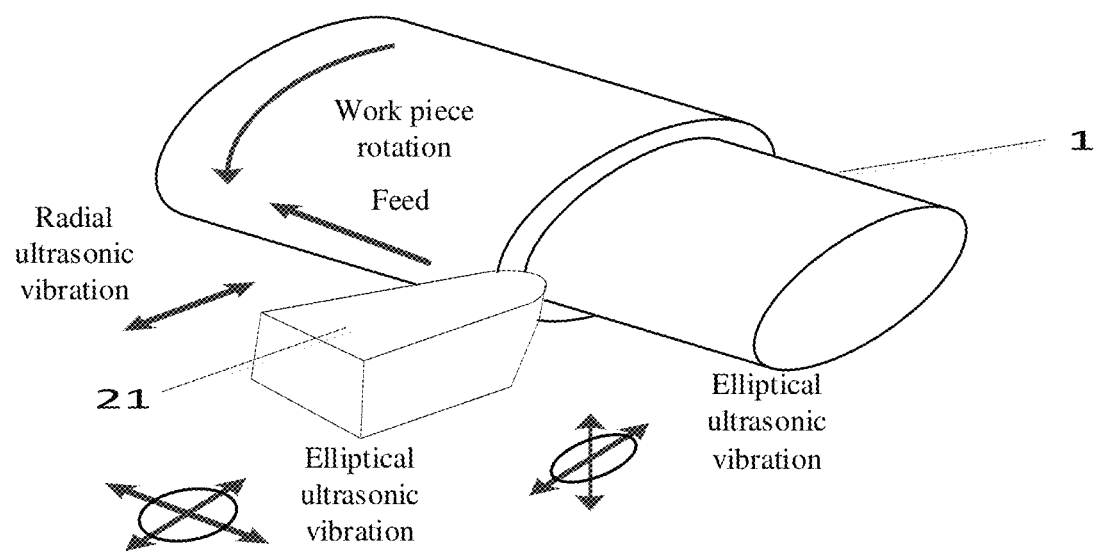
FIG. 7 is a schematic diagram of integrated turning and extruding processing by utilizing an ultrasonic peening-type integrated machining method of cutting and extrusion of the present invention.

FIG. 7 is a schematic diagram of integrated turning and extruding processing by utilizing an ultrasonic peening-type integrated machining method of cutting and extrusion of the present invention. When the ultrasonic peening-type integrated machining method of cutting and extrusion of the present invention is applied to a titanium alloy turning technology, the method includes the following steps:

S1: clamp a workpiece 1 on a machine tool spindle, and apply a radial ultrasonic vibration (as shown in FIG. 6) to a turning tool 21, where at this time, a vibration direction of the turning tool 21 is vertical to a cutting speed direction and points to a center line of the workpiece 1;

S2: adjust a turning parameter (where the cutting linear velocity of the turning tool 21 is 20 m/min, the cutting depth is 0.1 mm and the feeding amount is 0.02 mm/r) and a vibration parameter of the turning tool 21 (where the vibration frequency is 22330 Hz, and the vibration amplitude is 8 um); and S3: turn on a machine tool to realize an integrated turning and extruding processing procedure.

Additionally, the workpiece 1 is clamped on the machine tool spindle, and an elliptical ultrasonic vibration is applied to the turning tool 21 (as shown in FIG. 7), and at this time, the vibration direction of the turning tool 21 includes a radial vibration component and is also vertical to the cutting speed direction. Therefore, a turning parameter (where the cutting linear velocity of the turning tool 21 is 20 m/min, the cutting depth is 0.1 mm and the feeding amount is 0.02 mm/r) and a vibration parameter of the turning tool 21 (where the vibration frequency is 22330 Hz, and the vibration amplitude is 8 um) are adjusted, and the machine tool is turned on to be capable of realizing the integrated turning and extruding processing procedure. In FIG. 7, 1 represents the workpiece, and 21 represents the turning tool.

Figure 8:
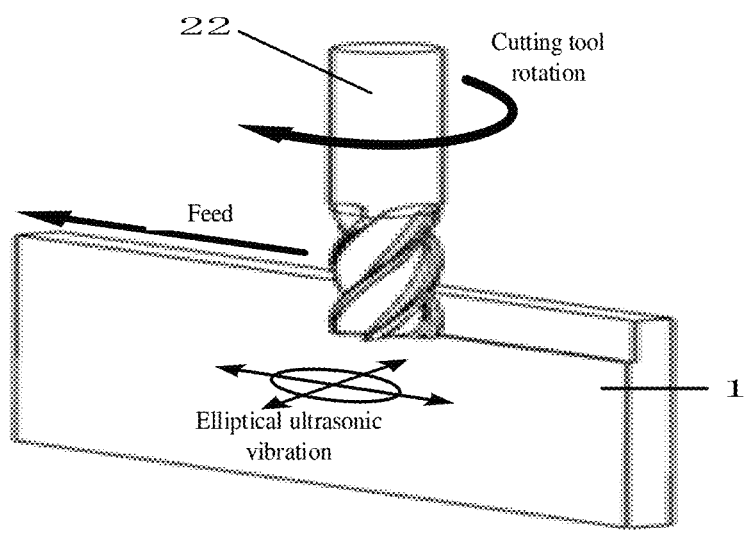
FIG. 8 and FIG. 9 are schematic diagrams of integrated milling and extruding processing by utilizing an ultrasonic peening-type integrated machining method of cutting and extrusion of the present invention.
Figure 9:
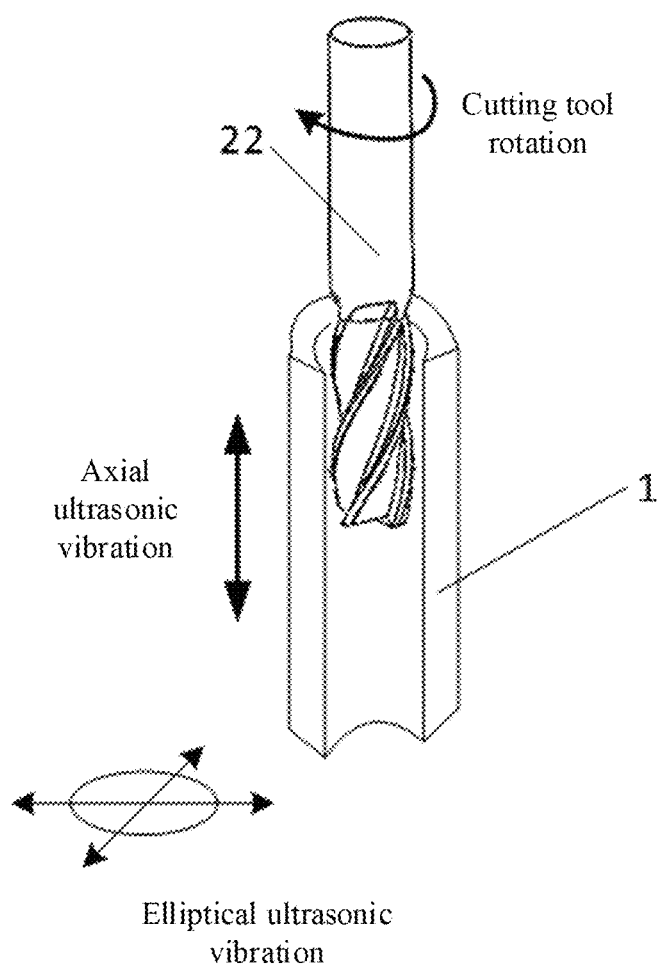

FIG. 8 and FIG. 9 are schematic diagrams of integrated milling and extruding processing by utilizing an ultrasonic peening-type integrated machining method of cutting and extrusion of the present invention. When the ultrasonic peening-type integrated machining method of cutting and extrusion of the present invention is applied to a titanium alloy milling technology, the method includes the following steps:

S1: fix a workpiece 1 to a milling machine, and apply ultrasonic vibration to a milling cutter 22, where when a side edge of the milling cutter 22 is used for milling a side face of the workpiece 1 (as shown in FIG. 8), a vibration direction of the milling cutter 22 is an elliptical ultrasonic vibration, and the elliptical ultrasonic vibration has a vibration component vertical to a cutting speed direction of each tooth of the milling cutter 22;

S2: adjust a milling parameter (where the cutting linear velocity of the milling cutter 22 is 80 m/min, the radial cutting depth is 0.1 mm, the axial cutting depth is 8 mm and the feeding amount is 0.01 mm/r) and a vibration parameter of the milling cutter 22 (where the vibration frequency is 28500 Hz, and the vibration amplitude is 8 um); and S3: turn on a machine tool to realize an integrated milling and extruding processing procedure.

Additionally, the workpiece 1 is fixed to the milling machine, the ultrasonic vibration is applied to the milling cutter 22, and when the milling cutter 22 is used for milling a round angle (as shown in FIG. 9), a vibration direction of the milling cutter 22 is axial or elliptical ultrasonic vibration, and the ultrasonic vibration is vertical to a cutting speed direction of each tooth of the milling cutter 22; the milling parameter (where the cutting linear velocity of the milling cutter 22 is 80 m/min, the radial cutting depth is 0.1 mm, the axial cutting depth is 8 mm and the feeding amount is 0.01 mm/r) and the vibration parameter of the milling cutter 22 (where the vibration frequency is 28500 Hz, and the vibration amplitude is 8 um) are adjusted, and the machine tool is turned on to realize; and the machine tool is turned on to be capable of realizing the integrated milling and extruding processing procedure. In FIG. 8 and FIG. 9, 1 represents the workpiece, and 22 represents the milling cutter.

Figure 10:
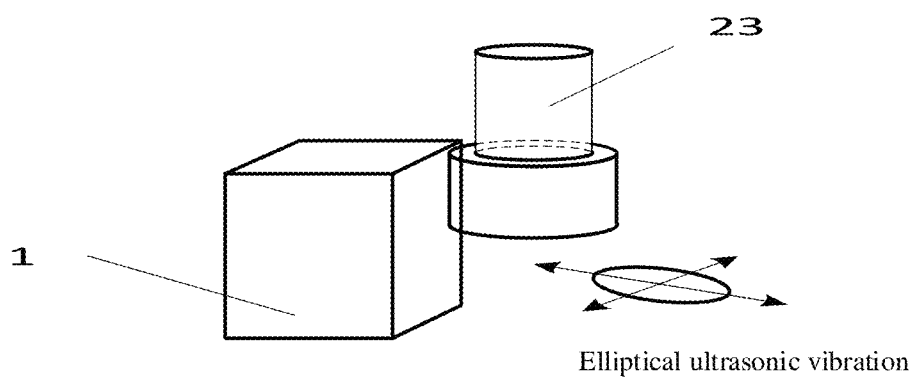
FIG. 10 and FIG. 11 are schematic diagrams of integrated grinding and extruding processing by utilizing an ultrasonic peening-type integrated machining method of cutting and extrusion of the present invention.
Figure 11:
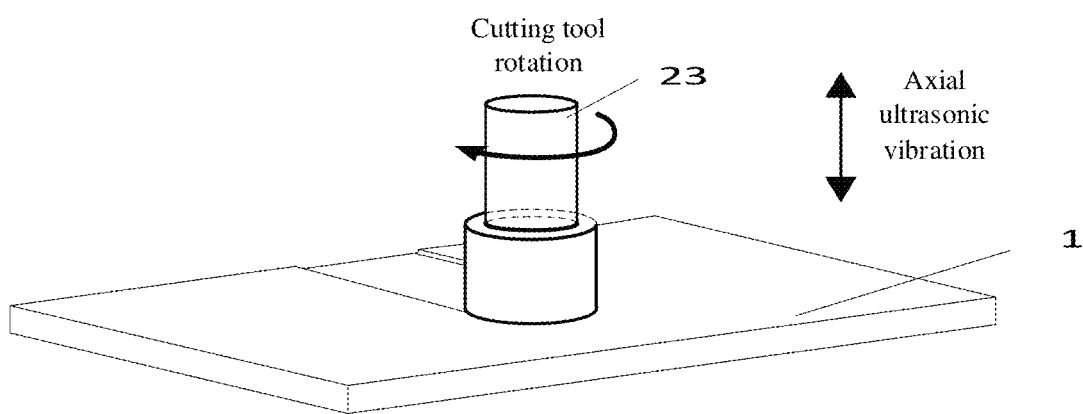

FIG. 10 and FIG. 11 are schematic diagrams of integrated milling and extruding processing by utilizing an ultrasonic peening-type integrated machining method of cutting and extrusion of the present invention. When the ultrasonic peening-type integrated machining method of cutting and extrusion of the present invention is applied to a titanium alloy grinding technology, the method includes the following steps:

S1: fix a workpiece 1 to a grinding machine, and apply ultrasonic vibration to a grinding head 23, where when abrasive particles on a side face of the grinding head 23 are used for grinding a side face of the workpiece 1 (as shown in FIG. 10), a vibration direction of the grinding head 23 is an elliptical ultrasonic vibration, and the elliptical ultrasonic vibration has a vibration component vertical to a cutting speed direction of each abrasive particle of the grinding head 23;

S2, adjust a grinding parameter (where the cutting linear velocity of the grinding head 23 is 50 m/s, the axial cutting depth is 0.5 mm, the radial cutting depth is 0.01 mm, and the feeding amount is 600 mm/min) and a vibration parameter of the grinding head 23 (where the vibration frequency is 22800 Hz, and the vibration amplitude is 8 um); and S3: turn on a machine tool to realize an integrated grinding and extruding processing procedure.

Additionally, the workpiece 1 is fixed to the grinding machine, the ultrasonic vibration is applied to the grinding head 23, and when abrasive particles on an end face of a grinding head 23 is used for grinding an end face of the workpiece 1 (as shown in FIG. 11), a vibration direction of the grinding head 23 is axial ultrasonic vibration, and the axial ultrasonic vibration is vertical to a cutting speed direction of each abrasive particle of the grinding head 23; the grinding parameter (where the cutting linear velocity of the grinding head 23 is 50 m/s, the axial cutting depth is 0.5 mm, the radial cutting speed is 0.01 mm, and the feeding amount is 600 mm/min) and the vibration parameter of the grinding head 23 (where the vibration frequency is 22800 Hz and the vibration amplitude is 8 um), and a machine tool is turned on to be capable of realizing an integrated grinding and extruding processing procedure. In FIG. 10 and FIG. 11, 1 represents the workpiece, and 23 represents the grinding head.

Figure 12:
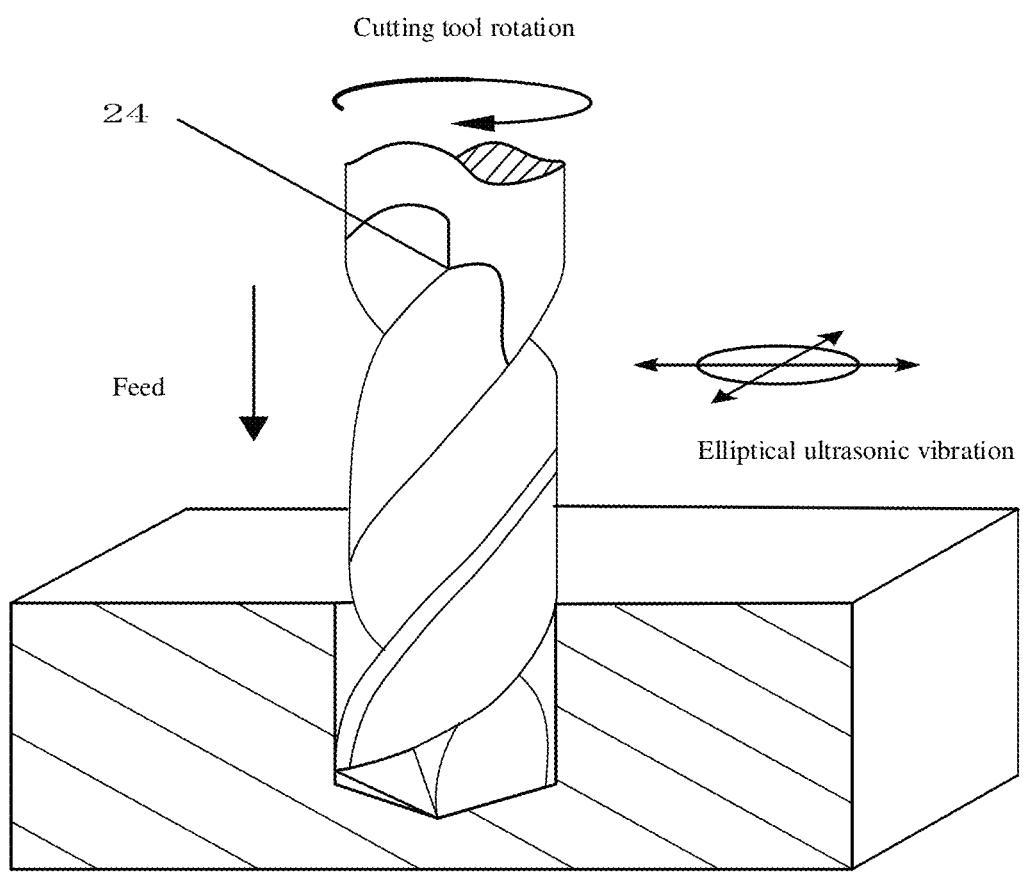
FIG. 12 is a schematic diagram of integrated drilling and extruding processing by utilizing an ultrasonic peening-type integrated machining method of cutting and extrusion of the present invention.

FIG. 12 is a schematic diagram of integrated drilling and extruding processing by utilizing an ultrasonic peening-type integrated machining method of cutting and extrusion of the present invention. When the ultrasonic peening-type integrated machining method of cutting and extrusion of the present invention is applied to a titanium alloy drilling technology, the method includes the following steps:

S1: fix a workpiece 1 to a drilling machine, and apply elliptical ultrasonic vibration to a drill bit 24 (as shown in FIG. 12), where at this time, the elliptical ultrasonic vibration of the drill bit 24 has a vibration component vertical to a cutting speed direction of a cutting edge of the drill bit 24;

S2: adjust a drilling parameter (where the cutting linear velocity of a cutting tool 2 is 60 m/min, and the feeding amount is 0.01 mm/r) and a vibration parameter of the drill bit 24 (where the vibration frequency is 27089 Hz, and the vibration amplitude is 10 um); and S3: turn on a machine tool to realize an integrated drilling and extruding processing procedure.

In FIG. 12, 24 represents the drill bit.

Figure 13:
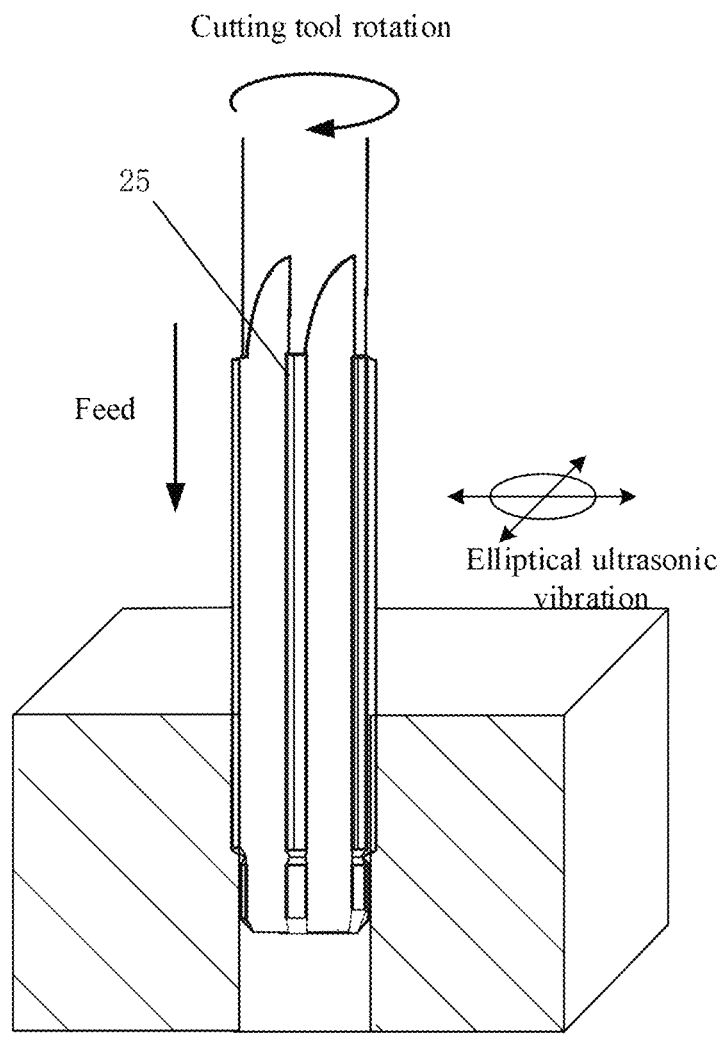
FIG. 13 is a schematic diagram of integrated reaming and extruding processing by utilizing an ultrasonic peening-type integrated machining method of cutting and extrusion of the present invention.

FIG. 13 is a schematic diagram of integrated reaming and extruding processing by utilizing an ultrasonic peening-type integrated machining method of cutting and extrusion of the present invention. When the ultrasonic peening-type integrated machining method of cutting and extrusion of the present invention is applied to a titanium alloy reaming technology, the method includes the following steps:

S1: fix a workpiece 1 to a machine tool, and apply elliptical ultrasonic vibration to a reamer 25 (as shown in FIG. 13), where at this time, the elliptical ultrasonic vibration of the reamer 25 has a vibration component vertical to a cutting speed direction of the reamer 25;

S2: adjust a reaming parameter (where the cutting linear velocity of the reamer 25 is 40 m/min, a cutting depth is 0.10 mm and the feeding amount is 0.005 mm/r) and a vibration parameter of the reamer 25 (where the vibration frequency is 21350 Hz, and the vibration amplitude is 4 um); and S3: turn on the machine tool to realize an integrated reaming and extruding processing procedure.

In FIG. 13, 25 represents the reamer.

Figure 14:
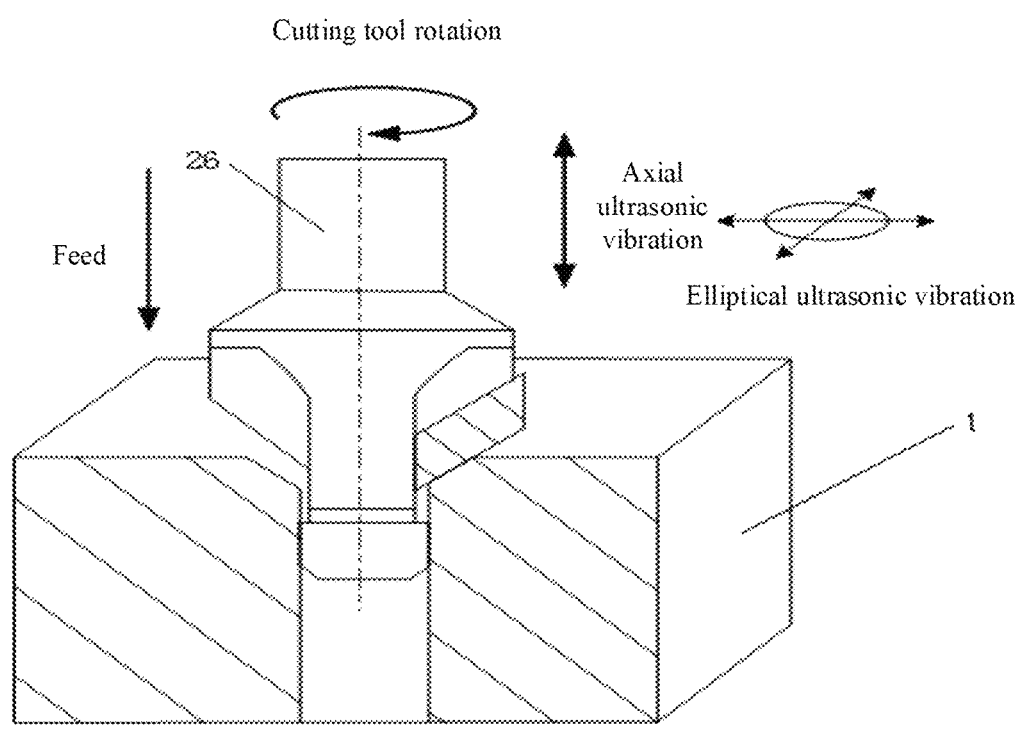
FIG. 14 is a schematic diagram of integrated countersinking and extruding processing by utilizing an ultrasonic peening-type integrated machining method of cutting and extrusion of the present invention.

FIG. 14 is a schematic diagram of integrated countersinking and extrusion processing by utilizing an ultrasonic peening-type integrated machining method of cutting and extrusion of the present invention. When the ultrasonic peening-type integrated machining method of cutting and extrusion of the present invention is applied to a titanium alloy reaming technology, the method includes the following steps:

S1: fix a workpiece 1 to a machine tool, and apply ultrasonic vibration to a countersink bit 26, where when a vibration direction of the countersink bit 26 is an axial ultrasonic vibration (as shown in FIG. 14), the vibration direction of the countersink bit 26 is vertical to a cutting speed direction and is in parallel to a feeding direction of the countersink bit 26; and when the vibration direction of the countersink bit 26 is elliptical ultrasonic vibration (as shown in FIG. 14), the elliptical ultrasonic vibration of the countersink bit 26 has a vibration component vertical to the cutting speed direction of a cutting edge of the countersink bit 26;

S2: adjust a countersinking parameter (where the cutting linear velocity of a countersink bit 26 is 80 m/min and the feeding amount is 0.01 mm/r) and a vibration parameter of the countersink bit 26 (where the vibration frequency is 28500 Hz and the vibration amplitude is 8 um); and S3: turn on the machine tool to realize an integrated countersinking and extruding processing procedure.

In FIG. 14, 1 represents the workpiece, and 26 represents the countersink bit.

The cutting parameter is given according to different processing materials and processing technologies. A principle of setting the cutting parameter and the vibration parameter is: the dynamic negative clearance angle is generated in a cutting procedure, and the flank face of the cutting tool conducts ultrasonic peening extrusion on the surface of the workpiece:

$$\alpha_t = \alpha - \arctan\frac{2\pi A F_z}{v_c} < 0$$

in formula, $\alpha_t$ is a dynamic clearance angle, $\alpha$ is a nominal clearance angle of the cutting tool, $v_c$ is a cutting speed, A is an ultrasonic amplitude, and $F_z$ is an ultrasonic vibration frequency; by acquiring a rotational frequency change amount $\Delta F_n$ of a machine tool spindle in real time, and by utilizing closed-loop control to compensate the ultrasonic vibration frequency $F_z$, the following formula is met, and it is achieved that the ultrasonic vibration frequency $F_z$ and the rotational frequency $F_n$ of the machine tool spindle are strictly synchronized; and the roughness of a cut and extruded surface of the workpiece is minimum:

$$\Delta F_z = M \cdot \Delta F_n$$

in formula, $\Delta F_z$ is an ultrasonic vibration frequency compensation value, $\Delta F_n$ is the rotational frequency change amount of the machine tool spindle, and M is a theoretical ratio of an ultrasonic vibration frequency $F_z$ required by controlling a specific phase difference to the rotational frequency $F_n$ of the machine tool spindle.

Figure 15:
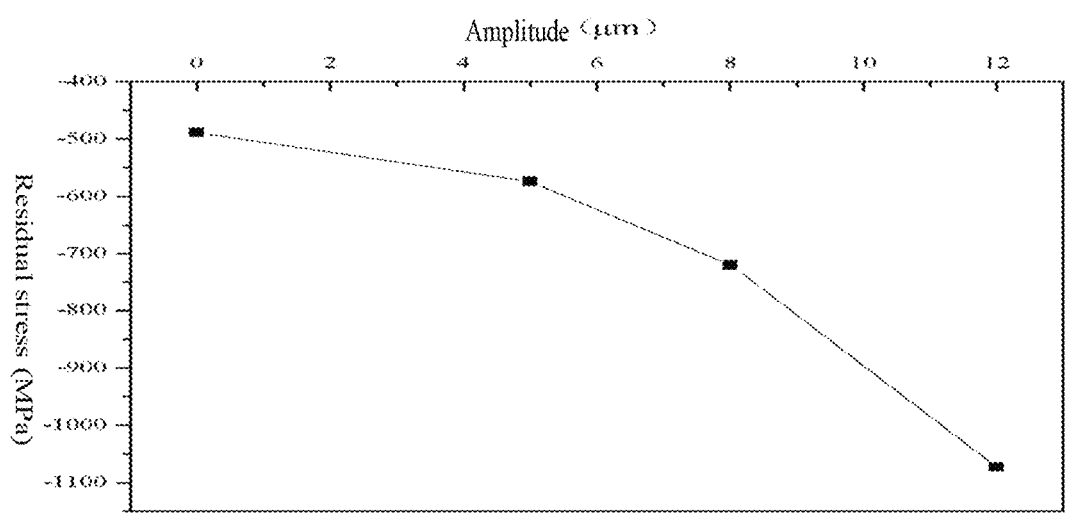
FIG. 15 is a schematic diagram showing the change of a residual compressive stress of a workpiece to be processed by utilizing an ultrasonic peening-type integrated machining method of cutting and extrusion of the present invention.
Figure 16:
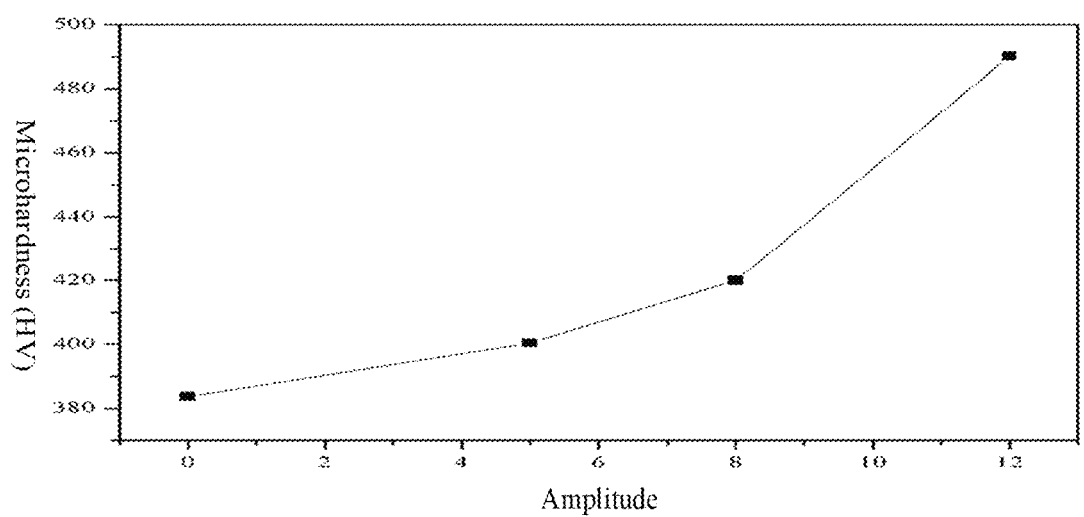
FIG. 16 is a schematic diagram showing the change of a microhardness of a surface of a workpiece to be processed by utilizing an ultrasonic peening-type integrated machining method of cutting and extrusion of the present invention.
Figure 17:
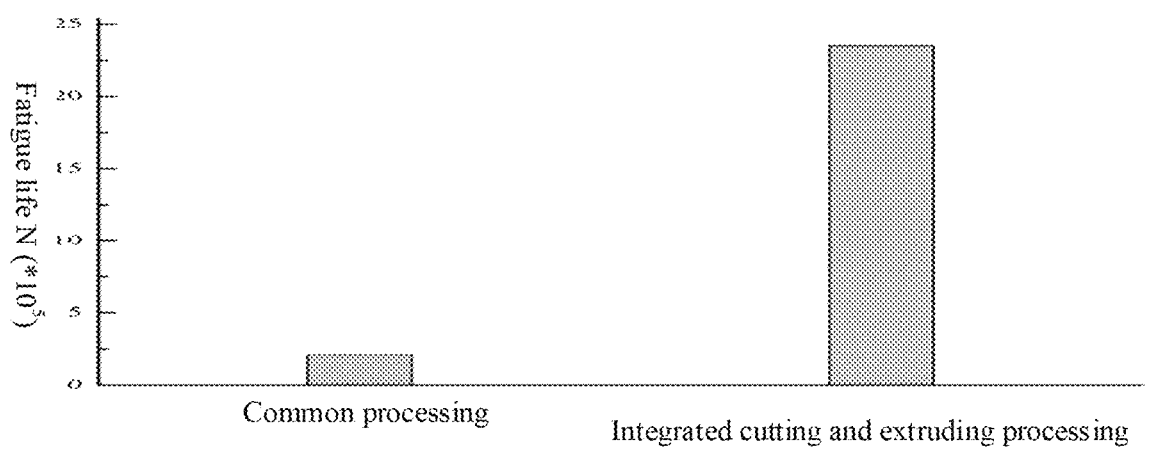
FIG. 17 is a fatigue life comparison diagram between a workpiece processed by utilizing an ultrasonic peening-type integrated machining method of cutting and extrusion of the present invention and a workpiece processed by utilizing a common cutting processing method.

According to the ultrasonic peening-type integrated machining method of cutting and extrusion of the present invention, firstly characteristics of the dynamic negative clearance angle of ultrasonic vibration are controlled and utilized to achieve an objective of peening extrusion, and vibration cutting of the cutting tool can reduce the average cutting force so as to achieve force reduction; and a cutting fluid can fully infiltrate into a cutting area to bring the cutting heat away so as to achieve heat reduction. The method can complete cutting and surface extrusion strengthening of the workpiece by one procedure; and when the method achieves cutting force and cutting heat reduction, it can further achieve that a stress state of a processed surface of the workpiece changes from a tensile stress or no remarkable surface stress to remarkable compressive stress on the premise of ensuring the roughness of the processed surface, can refine the surface structure of the workpiece, and can improve microhardness of the surface so as to remarkably prolonging the fatigue life of the workpiece. FIG. 15 is a schematic diagram showing the change of a residual compressive stress of a workpiece to be processed by utilizing an ultrasonic peening-type integrated machining method of cutting and extrusion of the present invention (an amplitude of 0 represents a common cutting processing); FIG. 16 is a schematic diagram showing the change of a microhardness of a surface of a workpiece to be processed by utilizing an ultrasonic peening-type integrated machining method of cutting and extrusion of the present invention (an amplitude of 0 represents a common cutting processing); and FIG. 17 is a fatigue life comparison diagram between a workpiece processed by utilizing an ultrasonic peening-type integrated machining method of cutting and extrusion of the present invention and a workpiece processed by utilizing a common cutting processing method, where FIG. 15, FIG. 16 and FIG. 17 are comparison diagrams between test results of titanium alloy processed by utilizing an integrated turning and extruding processing method and test results of titanium alloy processed by utilizing a common cutting processing method. In a test of the titanium alloy processed by utilizing the integrated turning and extruding processing method, a cutting parameter includes a linear velocity of 10 m/min, a cutting depth of 0.1 mm and a feeding amount of 0.04 mm/r, and the cutting fluid is emulsion. It can be seen from FIG. 15 that: the integrated method of cutting and extruding processing of the present invention can bring remarkable residual compressive stress to the workpiece and can remarkably improve an absolute value of the residual compressive stress compared with the common processing method; it can be seen from FIG. 16 that: compared with the common cutting processing method, the integrated method of cutting and extruding processing of the present invention can remarkably improve the microhardness of the surface of the workpiece; and it can be seen from FIG. 17 that: compared with the common cutting processing method, the integrated method of cutting and extruding processing of the present invention greatly improves fatigue fracture tensile times of a fatigue sample and can prolong fatigue life of the workpiece by eight times.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. An ultrasonic peening-type integrated machining method of cutting and extrusion, wherein the method comprises:
    applying transverse ultrasonic vibration, which is vertical to a cutting speed direction or comprises a vibration component vertical to the cutting speed direction, to a cutting tool on a machine tool;
    setting a cutting parameter and an ultrasonic vibration parameter such that a dynamic negative clearance angle is generated in a cutting procedure and a flank face of the cutting tool conducts ultrasonic peening extrusion on a surface of a workpiece; specifically comprising:
    setting the cutting parameter and the ultrasonic vibration parameter to meet formula (1) such that the dynamic negative clearance angle is generated in the cutting procedure and the flank face of the cutting tool conducts the ultrasonic peening extrusion on the surface of the workpiece;

$$\alpha_t = \alpha - \arctan\frac{2\pi A F_z}{v_c} < 0 \quad (1)$$

in the formula, $\alpha_1$ is a dynamic negative clearance angle, $\alpha$ is a nominal clearance angle of the cutting tool, $v_c$ is a cutting speed, A is an ultrasonic amplitude, and $F_z$ is an ultrasonic vibration frequency; a smaller dynamic clearance angle $\alpha_1$ indicates a larger amount of extrusion applied to the workpiece and a stronger extrusion effect;
    the cutting parameter comprises the cutting speed $v_c$ of the cutting tool, a feed rate $v_f$ and a cutting depth of the cutting tool; and
    the ultrasonic vibration parameter comprises the ultrasonic vibration frequency $F_z$ and the ultrasonic amplitude A,
    setting an extrusion overlap ratio; specifically comprising:
    calculating an extrusion overlap K by formula (2):

$$K = K_c \cdot K_f = \frac{l_e}{\lambda} \cdot \frac{w}{f_w} \quad (2)$$

in the formula, the extrusion overlap ratio K is a ratio of the sum of multiple extrusion areas of the cutting tool to an area of a processed surface of the workpiece: $K_c$ is an overlap ratio in the cutting speed direction, $l_e$ is a length of a single extrusion in the cutting speed direction in a vibration cutting period, $\lambda$ is a vibration cutting wavelength, $K_f$ is an overlap ratio in a blade width direction of the cutting tool, W is a blade width of the cutting tool, and $f_w$ is a feeding amount in the blade width direction: and a larger extrusion overlap ratio K indicates a more outstanding extrusion effect,
    setting a wear standard of flank faces extruded by the cutting tool;
    controlling a vibration cutting trajectory phase difference of the cutting tool during two adjacent rotations; and
    turning on the machine tool to ensure that cutting and surface extrusion strengthening of the workpiece are completed in one procedure.

2. The ultrasonic peening-type integrated machining method of cutting and extrusion according to claim 1, wherein the applying transverse ultrasonic vibration, which is vertical to a cutting speed direction or comprises a vibration component vertical to the cutting speed direction, to a cutting tool on a machine tool specifically comprises:
    applying radial or axial ultrasonic vibration vertical to the cutting speed direction to the cutting tool on the machine tool; or applying elliptical ultrasonic vibration comprising the vibration component vertical to the cutting speed direction to the cutting tool on the machine tool.

3. The ultrasonic peening-type integrated machining method of cutting and extrusion according to claim 1, wherein the setting a wear standard of flank faces extruded by the cutting tool specifically comprises:
    setting a corresponding wear standard of the flank face of the cutting tool according to a desired extrusion effect and a processing accuracy; wherein
    the desired extrusion effect considers: a nominal clearance angle of a flank face wear band is zero, so, when the flank face wear band replaces the flank face to extrude the workpiece, the dynamic clearance angle is further reduced, the length $l_e$ of a single extrusion in the vibration cutting period is increased, and the extrusion overlap ratio is increased;
    the processing accuracy considers: the flank face wear band may increase the roughness of the processed surface of the workpiece and reduce the processing accuracy.

4. The ultrasonic peening-type integrated machining method of cutting and extrusion according to claim 1, wherein the controlling a vibration cutting trajectory phase difference of the cutting tool during two adjacent rotations specifically comprises:
  acquiring a rotational frequency change amount $\Delta F_n$ of a machine tool spindle in real time, and compensating the ultrasonic vibration frequency by closed-loop control, wherein the compensation of the ultrasonic vibration frequency meets formula (3), the ultrasonic vibration frequency and the rotational frequency $F_n$ of the machine tool spindle are strictly synchronized, and the roughness of a machined surface of the workpiece is minimum;

$$\Delta F_z = M \cdot \Delta F_n \qquad (3)$$

in formula, $\Delta F_z$ is a compensation value of the ultrasonic vibration frequency, $\Delta F_n$ the rotational frequency change amount of the machine tool spindle, M is a theoretical ratio of an ultrasonic vibration frequency required by controlling a specific phase difference to the rotational frequency $F_n$ of the machine tool spindle.

5. The ultrasonic peening-type integrated machining method of cutting and extrusion according to claim 1, wherein the machine tool is a lathe, a milling machine, a drilling machine, a grinding machine or a machining center capable of conducting various cutting processing technologies.

6. The ultrasonic peening-type integrated machining method of cutting and extrusion according to claim 1, wherein the cutting tool is a turning tool, a milling cutter, a grinding head, a drill bit, or a reamer capable of conducting various cutting processing technologies.

* * * * *